US009932003B2

(12) United States Patent
Sato et al.

(10) Patent No.: US 9,932,003 B2
(45) Date of Patent: Apr. 3, 2018

(54) IN-VEHICLE POWER SUPPLY APPARATUS (71) Applicant: Hitachi Automotive Systems, Ltd., Hitachinaka-shi, Ibaraki (JP)

(72) Inventors: Chihiro Sato, Hitachinaka (JP); Hirofumi Kurimoto, Hitachinaka (JP); Yoshitaka Tokunaga, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 590 days.

(21) Appl. No.: 14/412,593

(22) PCT Filed: Jul. 3, 2013

(86) PCT No.: PCT/JP2013/068196
§ 371 (c)(1),
(2) Date: Jan. 2, 2015

(87) PCT Pub. No.: WO2014/007272
PCT Pub. Date: Jan. 9, 2014

(65) Prior Publication Data
US 2015/0224946 A1    Aug. 13, 2015

(30) Foreign Application Priority Data

Jul. 6, 2012   (JP) ................................. 2012-152859

(51) Int. Cl.
*B60R 16/033*  (2006.01)
*H02J 9/00*    (2006.01)
(Continued)

(52) U.S. Cl.
CPC ............ *B60R 16/033* (2013.01); *B60R 16/03* (2013.01); *G06F 1/24* (2013.01); *G06F 1/30* (2013.01); *H02J 9/00* (2013.01); *Y02T 10/92* (2013.01)

(58) Field of Classification Search
CPC ......................... G06F 1/24; G06F 1/30–1/305
See application file for complete search history.

(56) References Cited

U.S. PATENT DOCUMENTS

| 5,760,625 | A | * | 6/1998 | Macks | ................... G06F 1/305 327/143 |
| 2001/0023488 | A1 | * | 9/2001 | Breunig | .................. G06F 1/305 713/300 |

(Continued)

FOREIGN PATENT DOCUMENTS

| CN | 101207301 A | 6/2008 |
| CN | 101403943 A | 4/2009 |

(Continued)

OTHER PUBLICATIONS

Chinese-language Office Action issued in counterpart Chinese Application No. 201380035808.7 dated Apr. 29, 2017 (7 pages).

(Continued)

*Primary Examiner* — Rexford Barnie
*Assistant Examiner* — David Shiao
(74) *Attorney, Agent, or Firm* — Crowell & Moring LLP (57) ABSTRACT

An in-vehicle power supply apparatus for supplying operating power to a microcomputer is configured such that the microcomputer can securely enter into a standby state in a case where a voltage supplied from an in-vehicle power source is interrupted. The in-vehicle power supply apparatus according to the invention generates a second voltage to be supplied to a control IC and the like other than the microcomputer and a third voltage to be supplied to the microcomputer, and, in a case where the second voltage is reduced, the in-vehicle power supply apparatus transmits a reset signal and bypasses the second voltage to an input of the third voltage.

9 Claims, 4 Drawing Sheets

(51) Int. Cl.
*B60R 16/03* (2006.01)
*G06F 1/24* (2006.01)
*G06F 1/30* (2006.01)

(56) References Cited

U.S. PATENT DOCUMENTS

| | | | | |
|---|---|---|---|---|
| 2002/0116651 | A1* | 8/2002 | Beckert | G06F 1/30 |
| | | | | 713/300 |
| 2008/0284389 | A1 | 11/2008 | Kawase et al. | |
| 2009/0187781 | A1* | 7/2009 | Gronemeier | G06F 1/305 |
| | | | | 713/340 |
| 2009/0193278 | A1* | 7/2009 | Camilleri | G06F 1/305 |
| | | | | 713/340 |
| 2010/0229017 | A1* | 9/2010 | Ito | H02J 7/1423 |
| | | | | 713/340 |

FOREIGN PATENT DOCUMENTS

| | | | |
|---|---|---|---|
| JP | 2004-153931 A | 5/2004 | |
| JP | 2006-223070 A | 8/2006 | |
| JP | 2008-289254 A | 11/2008 | |

OTHER PUBLICATIONS

International Search Report (PCT/ISA/210) dated Sep. 17, 2013, with English translation (Three (3) pages).

\* cited by examiner

IN-VEHICLE POWER SUPPLY APPARATUS

TECHNICAL FIELD

The present invention relates to an in-vehicle power supply apparatus.

BACKGROUND ART

In recent years, a microcomputer provided in an in-vehicle control apparatus needs to receive, as an input, a plurality of voltages such as a voltage for a core voltage and a voltage for IO. Therefore, a rise sequence and a falling sequence for voltage supply are defined in advance. Further, the microcomputer generates an internal voltage in order to write data into a storage device such as a FLASH memory included in the microcomputer. In a case where the microcomputer is fallen, it is necessary to keep supplying a voltage to the microcomputer until this falling is completed so that the microcomputer keeps generating the internal voltage until the falling is completed.

In a case where supply of electric power from an in-vehicle power source (such as a battery) is interrupted, the microcomputer for controlling an in-vehicle apparatus stops arithmetic processing and writes an arithmetic result until then into a memory. In the in-vehicle power supply apparatus, in order to supply a rated voltage required by the microcomputer during a period in which the microcomputer writes the arithmetic result into the memory and until the internal voltage in the microcomputer is discharged, a capacitor is connected with an input terminal of the microcomputer. Note that a phenomenon in which supply of electric power is interrupted by the in-vehicle power source occurs in a case where, for example, a voltage of the in-vehicle power source is rapidly reduced by starting a load that consumes large electric power or by other reasons, wiring is disconnected, and relay controlled in response to an operation of an ignition switch or the like is turned off for some reason.

In a case where interruption of the relay caused by the above factor, disconnection of the wiring, and the like occur, when the in-vehicle power supply apparatus detects that a voltage supplied to the microcomputer is reduced, the in-vehicle power supply apparatus transmits a reset signal to the microcomputer. Then, the microcomputer stops the arithmetic processing in accordance with the reset signal and writes the arithmetic result into the memory, thereby entering into a standby state. Until the microcomputer enters into the standby state, the in-vehicle power supply apparatus needs to keep supplying a predetermined operation voltage and a predetermined current to the microcomputer. In order to cause the microcomputer to securely implement the above operation, it is necessary to increase a capacity of the capacitor connected with the input terminal of the microcomputer to ensure supply of electric power. This increases costs of the in-vehicle power supply apparatus.

As a method for solving the problem, PTL 1 below monitors an intermediate voltage V2 obtained by reducing a power supply voltage V1 and detects reduction of the voltage. Thus, reset response of the microcomputer is improved, as compared to a case where a microcomputer voltage is monitored, so that an unstable operation of the microcomputer is avoided.

Meanwhile, because a voltage of the microcomputer has been reduced in recent years, an internal core voltage becomes 3.3 V and a consumption current tends to be increased. Meanwhile, a voltage of 5 V, which has been conventionally used, is increasingly used only for an AD port and an I/O port, and therefore a consumption current tends to be decreased. This voltage of 5 V is also supplied to a control IC (Integrated Circuit) and the like other than the microcomputer.

The control IC other than the microcomputer has a factor of a noise source, and therefore, it is necessary to include an electrolytic capacitor as a measure against noises, which is a different reason from the reason for including the above capacitor for supplying electric power to the microcomputer. Specification of the control IC variously changes depending on an environment in which the control IC is mounted and further the microcomputer needs various voltage levels as described above, so that it is difficult to unconditionally determine how much capacities are enough for the capacitors. Also in view of this, it is necessary to ensure safety by increasing she capacity of the capacitor connected with the input terminal of the microcomputer.

CITATION LIST

Patent Literature

PTL 1: JP-A-2008-289254

SUMMARY OF INVENTION

Technical Problem

A technology described in PTL 1 above is configured such that reduction in voltage is early detected by monitoring the intermediate voltage V2 generated by reducing the power supply voltage V1 and the microcomputer is precedingly reset. However, in a case where a core voltage supplied to the microcomputer is reduced for some reason even though the intermediate voltage V2 is not reduced, there is a possibility that reset processing cannot be precedingly implemented.

The invention has been made in view of the above problem, and an object thereof is to provide an in-vehicle power supply apparatus for supplying operating power to a microcomputer, the in-vehicle power source apparatus being configured, such that the microcomputer securely enters into a standby state in a case where a voltage supplied from the in-vehicle power source is interrupted.

Solution to Problem

An in-vehicle power supply apparatus according to the invention generates a second voltage to be supplied to a control IC and the like other than a microcomputer and a third voltage to be supplied to the microcomputer and transmits a reset signal and bypasses the second voltage to an input of the third voltage in a case where the second voltage is reduced.

Advantageous Effects of Invention

In a case where a voltage supplied from an in-vehicle power source such as a battery is interrupted, an in-vehicle power supply apparatus according to the invention bypasses, as a core voltage of the microcomputer, a second voltage to be supplied to a control IC and the like other than a microcomputer. Therefore, the in-vehicle power supply apparatus can securely supply a rated voltage required by the microcomputer after a reset signal is transmitted but before the microcomputer enters into a standby state.

DESCRIPTION OF EMBODIMENTS

Embodiment 1: Device Configuration

Figure 1:
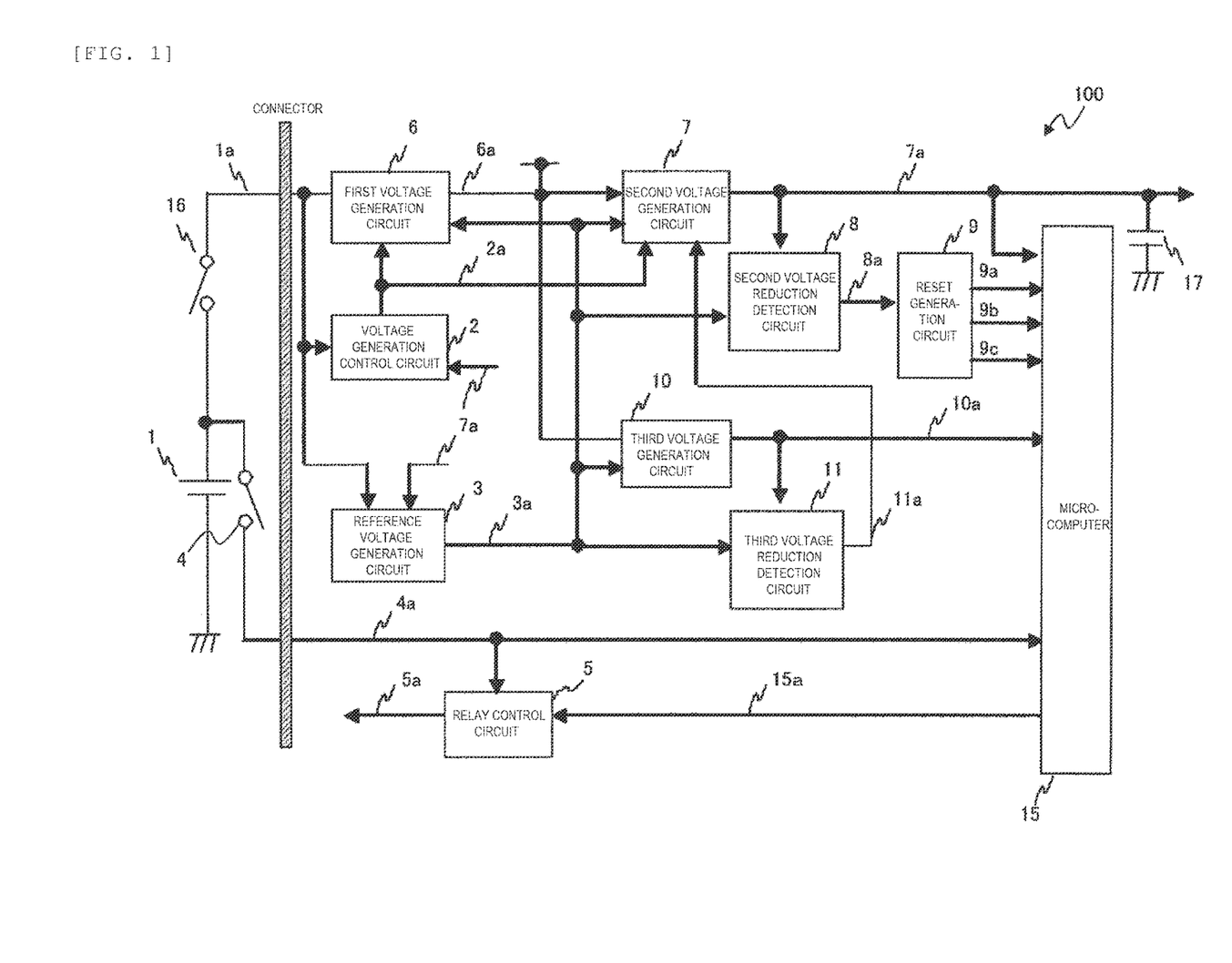
FIG. 1 is a circuit diagram of an in-vehicle power supply apparatus 100 according to Embodiment 1.

FIG. 1 is a circuit diagram of an in-vehicle power supply apparatus 100 according to Embodiment 1 of the invention. The in-vehicle power supply apparatus 100 is an apparatus having a function as a power supply circuit for providing a power source outputted from a battery 1 to an external apparatus such as a control IC, not shown) that is connected via a microcomputer 15 and a capacitor 17.

The in-vehicle power supply apparatus 100 include, as main components, a first voltage generation circuit 6, a second voltage generation circuit 7, a third voltage generation circuit 10, and a reset generation circuit 9. Other components will be described as appropriate.

An ignition switch 4 is a switch for starting a vehicle in which the in-vehicle power supply apparatus 100 is provided. In a case where the ignition switch 4 is turned on, the microcomputer 15 receives ignition switch information 4a indicating turning on of the ignition switch 4. The microcomputer 15 outputs relay control information 15a to a relay control circuit 5. The relay control circuit 5 turns on the relay 16 by outputting a relay control signal 5a in accordance with the relay control information 15a and the ignition switch information 4a, and causes a battery voltage 1a outputted from the battery 1 serving as an in-vehicle power source to be inputted to the in-vehicle power supply apparatus 100.

In a case where a voltage generation control circuit 2 detects the battery voltage 1a, the voltage generation control circuit 2 causes the first voltage generation circuit 6 to operate. The first voltage generation circuit 6 has a function as, for example, a switching regulator. The first voltage generation circuit 6 converts the battery voltage 1a into an appropriate voltage by increasing or reducing the battery voltage 1a, and outputs the appropriate voltage to the second voltage generation circuit 7 and the third voltage generation circuit 10. In a case where the battery voltage 1a can be directly supplied to the second voltage generation circuit 7 and the third voltage generation circuit 10, it is also possible to employ a configuration in which the first voltage generation circuit is omitted and the ignition switch information 4a is inputted to the voltage generation control circuit 2.

The second voltage generation circuit 7 converts a first voltage 6a generated by the first voltage generation circuit 6 into a second voltage 7a, and supplies the second voltage 7a to the control IC and the like other than the microcomputer 15. The second voltage 7a is also inputted to the microcomputer 15 as a power source of an I/O port and an AD port of the microcomputer 15.

The second voltage generation circuit 7 can be provided in a form of, for example, a linear regulator circuit in which a semiconductor switching element such as a MOSFET (Metal-Oxide-Semiconductor Field-Effect Transistor) is included and the second voltage 7a is generated with the use of the semiconductor switching element. The second voltage 7a is, for example, 5 V.

The second voltage generation circuit 7 further includes a feedback element for supplying an electric charge accumulated in the capacitor 17 as an input of the third voltage generation circuit 10 in a case where the semiconductor switching element is off. The feedback element can be configured with the use of, for example, a diode, however, is not limited thereto. In a case where the feedback element is configured with the use of a diode, the feedback element is configured such that a cathode terminal is connected with an input terminal of the second voltage generation circuit 7, an anode terminal is connected with an output terminal of the second voltage generation circuit 7, and a direction toward the first voltage 6a from the second voltage 7a is a forward direction of the diode.

The capacitor 17 is provided as a measure against noises of the control IC other than the microcomputer 15. As the capacitor 17, for example, a ceramic capacitor or an electrolytic capacitor can be used.

The third voltage generation circuit 10 generates a third voltage 10a by converting the first voltage 6a. The third voltage 10a is supplied to the microcomputer 15 as a core power source for operating the microcomputer 15. The third voltage 10a is, for example, 3.3 V.

The voltage generation control circuit 2 transmits a control signal 2a to the first voltage generation circuit. 6 and the second voltage generation circuit 7 on the basis of which one of the battery voltage 1a and the second voltage 7a is higher. Detailed description thereof will be made below.

The reference voltage generation circuit 3 generates a reference potential 3a. The first voltage generation circuit 6, the second voltage generation circuit 7, and the third voltage generation circuit 10 generate the first voltage 6a, the second voltage 7a, and the third voltage 10a, respectively, on the basis of the reference voltage 3a. The reference voltage 3a is also inputted to a second voltage reduction detection circuit 8 and a third voltage reduction detection circuit 11.

The second voltage reduction detection circuit 8 detects that the second voltage 7a becomes equal to or less than a predetermined threshold on the basis of the reference voltage 3a, and outputs a second voltage reduction detection signal 8a to the reset generation circuit 9.

The third voltage reduction detection circuit 11 detects that the third voltage 10a becomes equal to or less than the predetermined threshold on the basis of the reference voltage 3a, and outputs a third voltage reduction detection signal 11a to the second voltage generation circuit 7. In a case where the third voltage reduction detection signal 11a is outputted, the second voltage generation circuit 7 stops an operation for generating the second voltage 7a.

In a case where the reset generation circuit 9 receives the second voltage reduction detection signal 8a, the reset generation circuit 9 commands the microcomputer 15 to stop arithmetic processing and write an arithmetic result into a RAM (Random Access Memory) by outputting a low /INT 9a signal. After a time period for writing the arithmetic result into the RAM has passed, the reset generation circuit 9 causes the microcomputer 15 to enter into a reset state by outputting low /RST 9b. Furthermore, after a time period for discharging an internal voltage of the microcomputer 15 has passed, the reset generation circuit 9 causes the microcomputer 15 to enter into a standby state by outputting low /STBY 9c.

It is conceivable that three reset generation circuits 9 are provided for the first voltage 6a, the second voltage 7a, and the third voltage 10a, respectively, because the reset generation circuit 9 is provided to cause the microcomputer 15 to precedingly enter into the reset state in a case where a voltage supplied to the microcomputer 15 is reduced. However, in the invention, the reset generation circuit 9 is intensively provided in a single position, and is configured to output a reset signal when the second voltage 7a is reduced.

In a case where the third voltage 10a is reduced, the second voltage generation circuit 7 is stopped with the use of the third voltage reduction detection signal 11a, and therefore the second voltage 7a is also gradually reduced. As a result, the second voltage reduction detection signal 8a is outputted. Further, in a case where the battery 1 is interrupted and the first voltage 6a is reduced, the voltage generation control circuit 2 stops the second voltage generation circuit 7. As a result, the second voltage reduction detection signal 8a is outputted. Therefore, in the invention, it is possible to appropriately reset the microcomputer 15 without providing a plurality of reset generation circuits 9.

The configuration of the in-vehicle power supply apparatus 100 has been described above. Hereinafter, an operation principle of the in-vehicle power supply apparatus 100 will be described.

Embodiment 1: Operation Principle

In order to prevent sudden supply of a voltage to the microcomputer 15, an ordinary in-vehicle power supply apparatus appropriately controls on/off of the relay 16 by causing the microcomputer 15 to detect the ignition switch information 4a outputted from the ignition switch 4 and to output a relay control signal 15a. However, in a case where voltage supplied from the battery 1 is interrupted due to interruption of the relay 16, disconnection of wires, and the like, off of the ignition switch information 4a is not outputted because the ignition switch 4 is in an on state. Therefore, the microcomputer 15 cannot implement a predetermined reset sequence.

In this, in the invention, in order to accurately implement a falling sequence even in a case where the battery 1 is suddenly interrupted for some reason, the reference voltage generation circuit 3 generates the reference voltage 3a with the use of a higher voltage between the battery voltage 1a and the second voltage 7a. This makes it possible to stabilize the reference voltage 3a even in a case where the battery voltage 1a is reduced.

The in-vehicle control apparatus 100 can be configured such that the microcomputer 15 can securely implement the reset sequence with the use of an electric charge accumulated in the capacitor 17. Hereinafter, a principle thereof will be described.

The third voltage 10a supplied as a core operation voltage of the microcomputer 15 is reduced as the first voltage 6a is reduced to a certain voltage. In a case where the first voltage 6a is reduced, the second voltage 7a is also ordinarily reduced, and, in this case, a reset signal is supposed to be generated in principle. However, depending on the configuration of the in-vehicle control apparatus, a consumption current of the control IC and the like other than the microcomputer 15 is small in some cases. In this case, it is possible to satisfactorily provide electric power consumed by the control IC even in a case where an electric charge accumulated in the capacitor 17 is not largely discharged toward the control IC. Therefore, the third voltage 10a is reduced as the first voltage 6a is reduced before the second voltage reduction detection circuit 8 outputs the second voltage reduction detection signal 8a, and there is a fear in that, before the microcomputer 15 starts the reset sequence, the operation of the microcomputer 15 becomes unstable due to lack of the operation voltage.

In view of this, in the invention, in a case where the first voltage 6a becomes less than the second voltage 7a (strictly, a case where the first voltage 6a becomes less than a voltage obtained by subtracting a voltage reduction caused by the diode from the second voltage 7a, detailed description thereof will be described with reference to in FIG. 2), the second voltage generation circuit 7 turns off the semiconductor switching element, and forms a current path toward the third voltage generation circuit 10 from the capacitor 17 via the diode.

Therefore, even in a case where the first voltage 6a is reduced, it is possible to securely implement the falling sequence of the microcomputer 15 by keeping output of the third voltage 10a to the microcomputer 15. Furthermore, even in a circuit configuration in which a capacity of the capacitor 17 is increased, as a measure against noises and the second voltage 7a is not easily reduced, a reset signal can be generated by reducing the second voltage 7a for use in discharge and supply of an electric charge in the capacitor 17 to the control IC while the third voltage 10a is being retained by supplying an electric charge to the third voltage generation circuit 10 from the capacitor 17. This causes the microcomputer 15 to enter into the standby state while the third voltage 10a is being retained, and therefore it is possible to prevent decrease in reliability of the microcomputer 15.

Embodiment 1: Timing Chart

Figure 2:
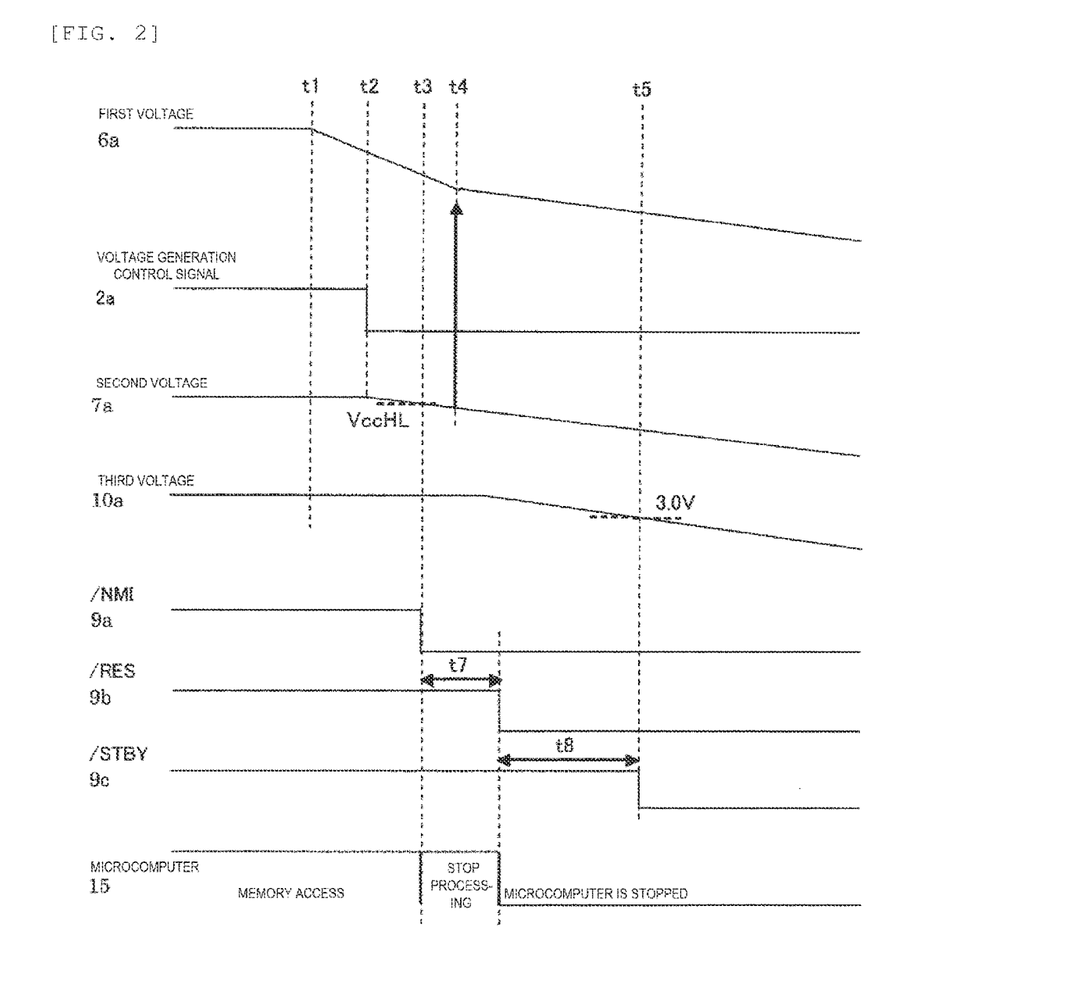
FIG. 2 is a timing chart showing an operation of an in-vehicle power supply apparatus 100.

FIG. 2 is a timing chart showing an operation of the in-vehicle power supply apparatus 100. Hereinafter, an operation flow of the in-vehicle power supply apparatus 100 will be described with reference to FIG. 2.

(FIG. 2: Time t1 to Time t2)

At a time t1, it is assumed that the battery 1 is interrupted for some reason and reduction of the first voltage 6a is started. At a time t2, the voltage generation control circuit 2 detects that the battery 1 becomes less than the predetermined threshold and stops the first voltage generation circuit 6 and the second voltage generation circuit 7. Therefore, the second voltage 7a is gradually reduced from the time t2.

(FIG. 2: Time t3: Transmission of /NMI 9a)

In a case where the second voltage reduction detection circuit 8 detects that the second voltage 7a becomes less than a predetermined low voltage detection threshold (VccHL), the second voltage reduction detection circuit 8 outputs the second voltage reduction detection signal 8a to the reset generation circuit 9. The reset generation circuit 9 outputs low /NMI 9a to the microcomputer 15.

(FIG. 2: Time t3: Reception of /NMT 9a)

The microcomputer 15 detects output of the low /NMI 9a outputted from the reset generation circuit 9, stops arithmetic processing and writes an arithmetic result into the RAM, and stops access to the RAM. A necessary time period for this process corresponds to a time period (t7) needed to implement software processing, and can be defined in advance in the reset generation circuit 9.

(FIG. 2: Time t3+t7: /RES 9b)

The reset generation circuit 9 outputs the low /NMI 9a and, after the prescribed time period t7 has passed, further outputs low /RES 9b. In a case were the microcomputer 15 detects the output of the low /RES 9b, the microcomputer 15 enters into a stop state. This corresponds to a time period (t8) needed to discharge the internal voltage of the microcomputer 15, and can be defined in advance in the reset generation circuit 9.

(FIG. 2: Time t3+t7+t8: /STBY 9c)

The reset generation circuit 9 outputs the low /RES 9b, and, after the prescribed time t8 has passed, further outputs low /STBY 9c. In a case where the microcomputer 15 detects output of the low /STBY 9c, the microcomputer 15 enters into the standby state. Until a time t5 at which entry of the microcomputer 15 into the standby state is completed, it is necessary to keep supplying, as the third voltage 10a, 3.0 V or larger, which is a minimum guaranteed operation voltage, to the microcomputer 15.

(FIG. 2: Time t4)

By a consumption current of the second voltage 7a and the third voltage 10a, the first voltage 6a becomes less than a voltage obtained by subtracting a VF voltage (e.g., 0.7 V) of the diode of the second voltage output circuit 7 from the second voltage 7a. In a case where the second voltage generation circuit 7 detects reduction of the voltage, the second voltage generation circuit 7 turns off the semiconductor switching element and starts to supply an electric charge toward the first voltage 6a (i.e., third voltage generation circuit 10) from an electric charge accumulated in the capacitor 17. Therefore, it is possible to retain the third voltage 10a having 3.0 V or larger until the time t5.

Embodiment 1: Numerical Examples

The operation described with reference to FIG. 1 to FIG. 2 will be described below with the use of specific numerical examples. The threshold VccHL for use in detection of reduction of the second voltage 7a, which is a trigger to generate a reset signal, is set to 4.7 V, and the VF voltage of the diode included in the second voltage generation circuit 7 is set to 0.7 V. The operation voltage of the microcomputer 15 is set to 3.3 V±0.3 V.

When the first voltage 6a becomes lower than the second voltage 7a, the second voltage generation circuit 7 turns off the semiconductor switching element, and supplies an electric charge to the third voltage generation circuit 10 from the capacitor 17 in principle. Note that it is necessary to consider the voltage reduction caused by the diode (herein, VF voltage=0.7 V) Therefore, in a case where the first voltage 6a becomes lower than 4.7 V−0.7 V=4.0 V, it is considered that the first voltage 6a is less than the second voltage 7a.

An internal resistance of the third voltage generation circuit 10 is set so that, for example, the third voltage 10a has 3.0 V or larger in a case where the first voltage 6a is equal to or larger than 3.5 V. With this, even in a case where the first voltage 6a becomes lower than 4.0 V and supply of an electric charge from the capacitor 17 is started, it is possible to keep supplying the third voltage 10a having 3.0 V or larger until the first voltage 6a is further reduced by 0.5 V. During this time period, the reset generation circuit 9 can cause the microcomputer 15 to enter into the standby state.

Embodiment 1: Summary

As described above, in a case where the first voltage 6a becomes lower than the second voltage 7a, the in-vehicle power supply apparatus 100 according to Embodiment 1 supplies an electric charge to the third voltage generation circuit 10 from the capacitor 17 to retain the third voltage 10a. Therefore, even in the circuit configuration in which the second voltage 7a is not easily reduced to a voltage less than the VccHL, it is possible to cause the microcomputer 15 to securely enter into the standby state.

Embodiment 2: Device Configuration

Figure 3:
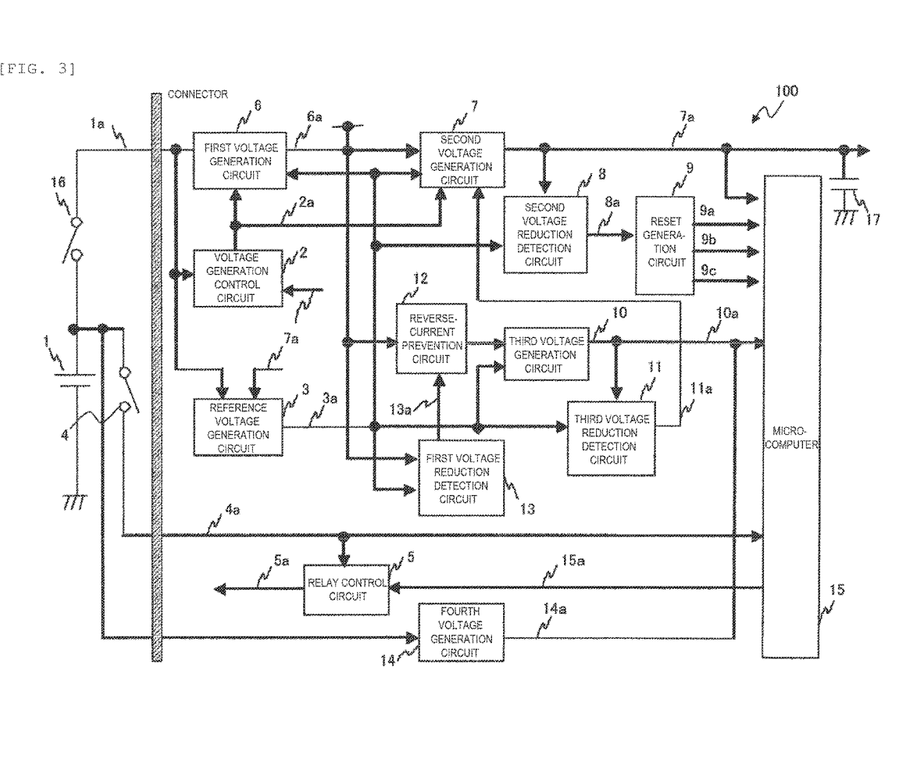
FIG. 3 is a circuit diagram of an in-vehicle power supply apparatus 100 according to Embodiment 2.

Embodiment 2 of the invention will describe a configuration example in which RAM data stored in the microcomputer 15 is retained even in a case where the ignition switch 4 is turned off or a case where a voltage supplied from a battery 1a is interrupted.

FIG. 3 is a circuit diagram of the in-vehicle power supply apparatus 100 according to Embodiment 2. The in-vehicle power supply apparatus 100 includes not only the circuit configuration described in Embodiment 1 but also additionally a reverse-current prevention circuit 12, a first voltage reduction detection circuit 13, and a fourth voltage generation circuit 14. Other configurations are similar to those of Embodiment 1, and therefore differences will be mainly described below.

The fourth voltage generation circuit 14 and an output terminal of the battery 1 are directly connected without interposing the ignition switch 4. The fourth voltage generation circuit 14 generates, with the use of the battery voltage 1a, the fourth voltage 14a which is substantially equal to the third voltage 10a, and connects the fourth voltage 14a in parallel with an output of the third voltage generation circuit 10. The fourth voltage 14a is a voltage that can retain data in the RAM included in the microcomputer 15.

The reverse-current prevention circuit 12 prevents a reverse current flown to the third voltage (generation circuit 10 from the fourth voltage generation circuit 14. Because the fourth voltage 14a is always supplied from the battery 1, the fourth voltage 14a is not reduced even in a case where the first voltage 6a is reduced. For example, in a case where the battery voltage 1a is interrupted, the third voltage 10a is also gradually reduced, and finally becomes equal to or less than the fourth voltage 14a. As a result, a reverse current toward an input side of the third voltage generation circuit 10 from the fourth voltage generation circuit 14 is generated. The fourth voltage generation circuit 14 has only a current capability to hold the RAM data of the microcomputer 15, and therefore, in a case where a reverse current that does not flow no the microcomputer 15 is generated, the fourth voltage 14a is gradually reduced. Therefore, the RAM data cannot be held. In order to avoid this state, the reverse-current prevention circuit 12 for preventing a reverse current from the fourth voltage generation circuit 14 is provided on the input side of the third voltage generation circuit 10.

The reverse-current prevention circuit 12 includes a semiconductor switching element such as a MOSFET. The semiconductor switching element is ordinarily in an on state, and is connected with the first voltage 6a as the input of the third voltage generation circuit 10. The reverse-current prevention circuit 12 includes a diode in which an anode terminal thereof is electrically connected with an output of the first voltage generation circuit 6a and a cathode terminal thereof is electrically connected with the input terminal of the third voltage generation circuit 10. That is, the diode is placed in a forward direction toward the third voltage generation circuit 10 from the first voltage generation circuit 6.

In a case where the first voltage low-voltage desertion circuit 13 detects that the first voltage 6a becomes less than the predetermined threshold, the reverse-current prevention circuit 12 turns off the semiconductor switching element, thereby preventing wraparound of a voltage with the use of the diode.

With the above configuration, even in a case where the battery 1 is suddenly interrupted for some reason, the RAM data in which information needed to start the microcomputer 15 in a next time is stored can be held until the battery voltage 1a is supplied again and the microcomputer 15 is started again.

Embodiment 2: Timing Chart

Figure 4:
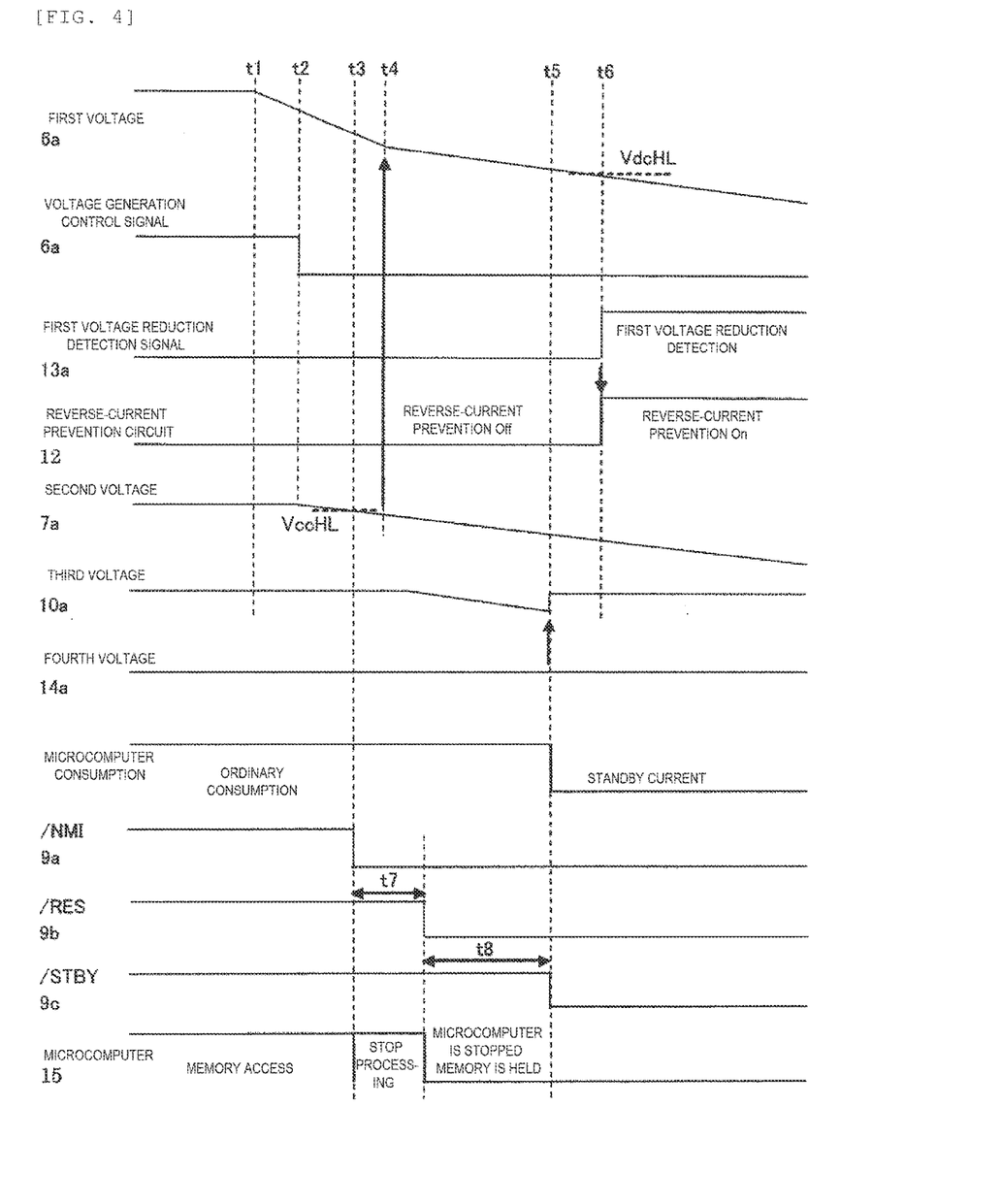
FIG. 4 is a timing chart showing an operation of an in-vehicle power supply apparatus 100 according to Embodiment 2.

FIG. 4 is a timing chart showing an operation of the in-vehicle power supply apparatus 100 according to Embodiment 2. Hereinafter, an operation flow of the in-vehicle power supply apparatus 100 according to Embodiment 2 will be described with reference to FIG. 4. The operation until the time t5 is similar to that of Embodiment 1, and therefore description thereof will be omitted.

The microcomputer 15 operates in an ordinary consumption current mode until the microcomputer 15 receives the /STBY 9c from the reset generation circuit 9, and therefore, the third voltage 10a and the fourth voltage 14a are reduced even in a case where the fourth voltage 14a is connected in parallel with the third voltage 10a.

In a case where the microcomputer 15 receives the /STBY 9c at the time 5, the microcomputer 15 enters into a standby consumption mode from the ordinary consumption current mode, and therefore it is possible to continue the operation of the microcomputer 15 by using only the fourth voltage 14a. The third voltage is increased at the time t5 because of surplus of the fourth voltage 14a. The first voltage 6a is continuously reduced, and therefore a reverse current toward the first voltage 6a via the third voltage generation circuit 10 tends to be generated.

It is assumed that, at a time t6, the first voltage reduction detection circuit 13 detects that the first voltage 6a becomes lower than a voltage threshold vdcHL. In a case where the reverse-current prevention circuit 12 receives a first voltage reduction detection signal 13a, the reverse-current prevention circuit 12 turns off the semiconductor switching element, and prevents a reverse current with the use of the diode and also prevents reduction of the fourth voltage 14a. Therefore, it is possible to hold the RAM data stored in the microcomputer 15 until the microcomputer 15 is started again.

Embodiment 2: Numerical Example

As a numerical example, it is assumed that the fourth voltage 14a is 3.3 V. In this case, it is possible to prevent a reverse current toward the first voltage 6a by setting the detection threshold vdcHL of the first voltage low-voltage detection circuit 13 to 3.3V or larger.

Embodiment 2: Summary

As described above, the fourth voltage generation circuit 14 keeps supplying the fourth voltage 14a to the microcomputer 15, and therefore the in-vehicle power supply apparatus 100 according to Embodiment 2 can hold, on the RAM, the data to be needed to start the microcomputer 15 in a next time until the microcomputer 5 enters into a standby state and is started again in the next time.

REFERENCE SIGNS LIST

1: battery
1a: battery voltage
2: voltage generation control circuit
2a: voltage generation control signal
3: reference voltage generation circuit
3a: reference voltage
4: ignition switch
4a: ignition switch information
5: relay control circuit
5a: relay control signal
6: first voltage generation circuit
6a: first voltage
7: second voltage generation circuit
7a: second voltage
8: second voltage reduction detection circuit
8a: second voltage reduction detection signal
9: reset generation circuit
9a: /INT
9b: /RST
9c: /STBY
10: third voltage generation circuit
10a: third voltage
11: third voltage reduction detection circuit
11a: third voltage reduction detection signal
12: reverse-current prevention circuit
13: first voltage reduction detection circuit
13a: first voltage reduction detection signal
14: fourth voltage generation circuit
14a: fourth voltage
15: microcomputer
15a: relay control information
16: relay
17: capacitor

The invention claimed is:

1. An in-vehicle power supply apparatus, comprising:
a second voltage generation circuit configured to generate a second voltage with the use of a voltage supplied from an in-vehicle power source;
a third voltage generation circuit configured to generate a third voltage with the use of the voltage supplied from the in-vehicle power source and supplying the third voltage to a microcomputer;
a reset generation circuit configured to output a reset signal to command reset of the microcomputer in a case where the second voltage is reduced, wherein
the second voltage generation circuit reduces the second voltage in a case where the third voltage is reduced; and
a capacitor connected with an output side of the second voltage generation circuit, wherein
in a case where a voltage applied to the second voltage generation circuit is reduced, the second voltage generation circuit supplies an electric charge accumulated in the capacitor to an input side of the third voltage generation circuit by forming a path for feeding back a current from an output side of the second voltage generation circuit to an input side of the second voltage generation circuit,
the second voltage generation circuit includes
a semiconductor switching element capable of controlling on/off, and
a feedback element for forming the path for feeding back a current to an input side from the output side of the second voltage generation circuit, one end of the feedback element is electrically connected with the capacitor and the other end of the feedback element is electrically connected with the input side of the third voltage generation circuit, and in a case where a voltage applied to the second voltage generation circuit becomes less than a voltage obtained by subtracting a voltage reduction caused by the feedback element from an output voltage of the second voltage generation circuit, the second voltage generation circuit turns off the semiconductor switching element and then forms the path for feeding back a current to the input side from the output side of the second voltage generation circuit via the feedback element.

2. The in-vehicle power supply apparatus according to claim 1, wherein
the reset generation circuit outputs, as the reset signal,
a signal for commanding writing of an arithmetic result into a memory after processing of the microcomputer is stopped,
a signal for commanding the microcomputer to enter into a reset state, and
a signal for commanding the microcomputer to enter into a standby state,
in the above order.

3. The in-vehicle power supply apparatus according to claim 1, further comprising
a first voltage generation circuit configured to supply the voltage outputted from the in-vehicle power source to the second voltage generation circuit and the third voltage generation circuit by increasing or reducing the voltage supplied from the in-vehicle power source.

4. The in-vehicle power supply apparatus according to claim 3, wherein
in a case where an input voltage from the in-vehicle power source becomes less than a predetermined lower limit value, the first voltage generation circuit and the second voltage generation circuit reduce the second voltage to a voltage less than a predetermined voltage by stopping operations of the first voltage generation circuit and the second voltage generation circuit, and therefore cause the reset generation circuit to output the reset signal.

5. The in-vehicle power supply apparatus according to claim 1, further comprising:
a fourth voltage generation circuit configured to generate a fourth voltage with the use of the voltage supplied from the in-vehicle power source; and
an electric switch for electrically connecting an output of the in-vehicle power source to the second voltage generation circuit and the third voltage generation circuit, wherein
an input of the fourth voltage generation circuit and an output of the in-vehicle power source are electrically connected without interposing the electric switch, the output of the fourth voltage generation circuit being connected in parallel with an output of the third voltage generation circuit.

6. The in-vehicle power supply apparatus according to claim 5, further comprising
a reverse-current prevention circuit configured to prevent a reverse current to an input of the in-vehicle power source from an output of the fourth voltage generation circuit via the third voltage generation circuit.

7. The in-vehicle power supply apparatus according to claim 6, wherein
the reverse-current prevention circuit includes
a semiconductor switching element capable of controlling on/off, and
a diode that is placed so that a direction toward an input of the third voltage generation circuit from the output of the in-vehicle power source is a forward direction.

8. The in-vehicle power supply apparatus according to claim 7, wherein
in a case where an input voltage from the in-vehicle power source becomes less than a predetermined lower limit value, the reverse-current prevention circuit prevents a reverse current with the use of the diode by turning off the semiconductor switching element.

9. The in-vehicle power supply apparatus according to claim 5, wherein
the fourth voltage generation circuit outputs, as the fourth voltage, a voltage capable of causing at least the microcomputer to retain a standby state.

* * * * *